(12) United States Patent
Kim

(10) Patent No.: US 10,782,835 B2
(45) Date of Patent: Sep. 22, 2020

(54) IN-CELL TOUCH DISPLAY DEVICE

(71) Applicant: LG Display Co., Ltd., Seoul (KR)

(72) Inventor: Hongjae Kim, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/523,638

(22) Filed: Jul. 26, 2019

(65) Prior Publication Data
US 2020/0064950 A1 Feb. 27, 2020

(30) Foreign Application Priority Data

Aug. 24, 2018 (KR) ........................ 10-2018-0099238

(51) Int. Cl.
*G06F 3/044* (2006.01)
*G09G 3/36* (2006.01)
*G06F 3/041* (2006.01)

(52) U.S. Cl.
CPC ............ *G06F 3/044* (2013.01); *G06F 3/0412* (2013.01); *G09G 3/3648* (2013.01); *G09G 3/3696* (2013.01)

(58) Field of Classification Search
CPC ... G09G 3/3648; G09G 3/3696; G06F 3/0412
See application file for complete search history.

(56) References Cited

U.S. PATENT DOCUMENTS

| 9,330,624 | B1 * | 5/2016 | Pei | ........................ | G09G 3/3696 |
| 2009/0015528 | A1 * | 1/2009 | Sheu | ..................... | G09G 3/3655 345/87 |
| 2010/0201669 | A1 * | 8/2010 | Kim | ..................... | G09G 3/3648 345/211 |
| 2012/0081320 | A1 * | 4/2012 | Hwang | ................. | G06F 3/0418 345/173 |
| 2012/0146920 | A1 * | 6/2012 | Lin | ........................ | G06F 3/0418 345/173 |
| 2013/0088476 | A1 * | 4/2013 | Yamagishi | ........... | G09G 3/3655 345/211 |
| 2013/0241873 | A1 * | 9/2013 | Kim | ..................... | H05K 1/0228 345/174 |
| 2013/0314393 | A1 * | 11/2013 | Min | ..................... | G09G 3/3655 345/212 |
| 2013/0335342 | A1 * | 12/2013 | Kim | ........................ | G02F 1/13 345/173 |
| 2016/0195956 | A1 * | 7/2016 | Zhao | ..................... | G06F 3/0416 345/174 |
| 2018/0120996 | A1 * | 5/2018 | Kang | ..................... | G06F 3/0412 |

FOREIGN PATENT DOCUMENTS

| KR | 10-2017-0036852 A | 4/2017 |
| KR | 10-2018-0047153 A | 5/2018 |

\* cited by examiner

*Primary Examiner* — Priyank J Shah
(74) *Attorney, Agent, or Firm* — Fenwick & West LLP

(57) ABSTRACT

An in-cell touch display device compensates for half of a ripple component of a common voltage sensed from one touch electrode among a plurality of touch electrodes. This may suppress horizontal crosstalk and dim that otherwise occur in a conventional in-cell touch display device because common voltages supplied to a display panel are non-uniform according to positions of subdivided common electrodes.

9 Claims, 13 Drawing Sheets

[ Small area display device ]

[ Large area display device ]

IN-CELL TOUCH DISPLAY DEVICE

CROSS-REFERENCE TO RELATED APPLICATIONS

This application claims the priority benefit of Republic of Korea Patent Application No. 10-2018-0099238 filed on Aug. 24, 2018, the disclosure of which is hereby incorporated by reference in its entirety.

BACKGROUND

Technical Field

The present disclosure relates to an in-cell touch display device to compensate for a common voltage.

Description of the Related Art

Recently, a touch UI (User Interface) has been adopted into a display device such as a smart phone, a tablet, and a TV, etc. In particular, an in-cell touch sensor technology in which a touch sensor (touch electrode) is embedded into a pixel array is applied to many display devices.

Since the in-cell touch sensor technology does not require a separate substrate on which a touch sensor is disposed, weight increase and thickness increase of a display panel may be prevented, and excellent optical characteristics, low power consumption, and good durability may be obtained.

According to the in-cell touch sensor technology, the touch sensor is embedded in the pixel array while sharing an electrode, for example a common electrode, used to drive a pixel in a conventional display device.

For example, according to the in-cell touch sensor technology, a common electrode for supplying a common voltage to a pixel may be divided into sub-electrodes which are partially allocated to the touch sensor.

However, in this case, the common voltages supplied to the sub-electrodes vary depending on positions of the sub-electrodes. As a result, horizontal crosstalk and dim phenomenon may occur.

In order to prevent such problems, an in-cell touch display device which may compensate for the common voltage difference has been studied.

SUMMARY

The present disclosure aims at solving the above-mentioned problems. A purpose of the present disclosure is to provide an in-cell touch display device that compensates for ½ of a ripple component of a common voltage sensed from one touch electrode among a plurality of touch electrodes.

Further, the present disclosure is to provide an in-cell touch display device that compensates for a ripple component of a common voltage sensed from a touch electrode connected to the longest sensing line for supplying a common voltage.

Further, the present disclosure is to provide an in-cell touch display device that minimizes parasitic capacitance between a touch electrode and a gate line and a data line within a touch period according to a time-divided driving scheme.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the purposes and advantages of the present disclosure may be realized by features and combinations thereof as disclosed in the claims.

In one aspect of the present disclosure, there is proposed an in-cell touch display device comprising: a display panel having a plurality of pixel electrodes for displaying an image in a display period and a plurality of touch electrodes for recognizing a touch in a touch period; a data driver for supplying a data voltage to the plurality of pixel electrodes via a plurality of data lines; a gate driver for supplying a gate voltage to the plurality of pixel electrodes via a plurality of gate lines intersecting the plurality of data lines; a touch driver for supplying a common voltage to the plurality of touch electrodes through a plurality of sensing lines respectively connected to the plurality of touch electrodes; and a common voltage compensator configured for: sensing a feedback common voltage from one touch electrode among the plurality of touch electrodes; and supplying a compensating common voltage for cancelling ½ of the ripple component of the feedback common voltage to the plurality of touch electrode.

In one implementation, the common voltage compensator senses the feedback common voltage from a touch electrode connected to a longest sensing line among the plurality of sensing lines.

In one implementation, the touch driver supplies the common voltage in a column direction of the display panel, wherein the common voltage compensator senses the feedback common voltage from one touch electrode in a first row of the display panel.

In one implementation, the touch driver supplies the common voltage in a row direction of the display panel, wherein the common voltage compensator senses the feedback common voltage from one touch electrode in a first column of the display panel.

In one implementation, the common voltage compensator is further configured for: generating the compensating common voltage having a half magnitude of the ripple component and an opposite polarity to a polarity of the ripple component; and supplying the generated compensating common voltage to the plurality of touch electrodes.

In one implementation, the common voltage compensator includes: an inverting amplifier including: an inverted input terminal connected to a feedback line to which the feedback common voltage is supplied; a non-inverted input terminal connected to a reference voltage source; and an output terminal for outputting the compensating common voltage; a first resistor disposed between and connected to the inverted input terminal and the output terminal; a capacitor for receiving the feedback common voltage from the feedback line; and a second resistor disposed between and connected to the capacitor and the inverted input terminal.

In one implementation, a resistance value of the first resistor is ½ of a resistance value of the second resistor.

In one implementation, the display panel is driven such that one frame period is temporally divided into a display period and a touch period, wherein in the display period, the gate voltage is sequentially supplied to the plurality of gate lines, the data voltage is supplied sequentially to the plurality of data lines, and the common voltage is supplied to the plurality of touch electrodes, wherein in the touch period, a touch driving voltage is supplied to the plurality of the touch electrodes, and a voltage having the same phase and amplitude as the touch driving voltage is supplied to at least one of the plurality of gate lines and at least one of the plurality of data lines.

In one implementation, the display panel is driven such that one frame period is temporally divided into a plurality of display periods and a plurality of touch periods having the same driving time duration.

As described above, according to the present disclosure, when compensating for ½ of the ripple component of the common voltage sensed from one touch electrode of the plurality of touch electrodes, the device may compensate for the common voltage applied to each of all touch electrodes via the single feedback line. Therefore, the GPM (Gate Pulse Modulation) is applied in driving of the large area pixel electrode, the effective charging time (ECT) can be secured for all pixels.

Further, according to the present disclosure, compensating the ripple component of the common voltage sensed from the touch electrode connected to the longest sensing line supplying the common voltage may result in improving the consistency and efficiency of the common voltage compensating operation via the single feedback line. In other words, the feedback common voltage is sensed from the touch electrode corresponding to the largest ripple component, and, then, the ripple component is compensated for based on this sensed feedback common voltage. Thus, the common voltage compensating operation for all the touch electrodes arranged on the display panel can be performed in a consistent manner.

Further, in accordance with the present disclosure, the touch recognition sensitivity may be improved by minimizing the parasitic capacitance between the touch electrode and the gate line and data line within the touch period according to the time-divided driving scheme.

In addition to the above effects, specific effects of the present disclosure are described below in conjunction with descriptions of specific details to implement the present disclosure.

DETAILED DESCRIPTION

Figure 1:
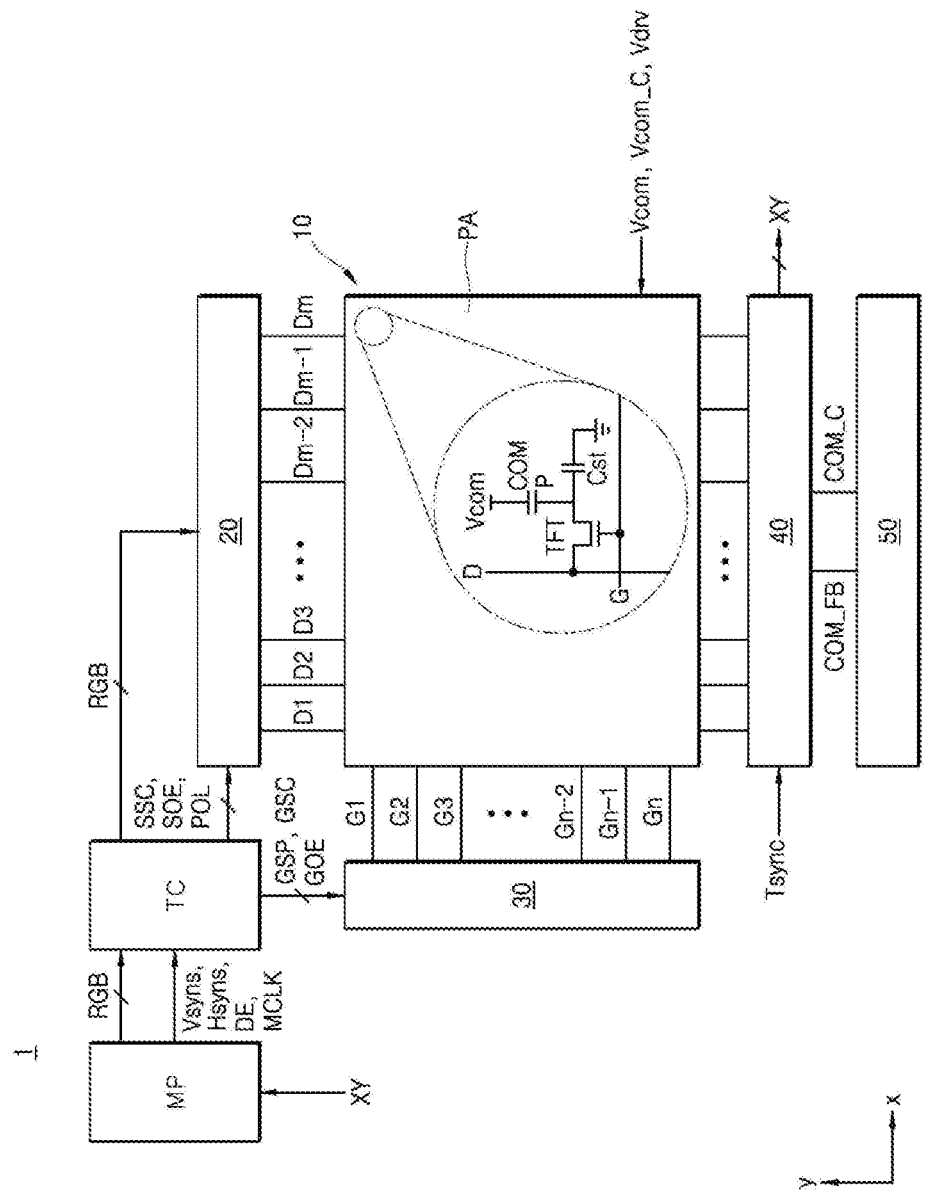
FIG. 1 illustrates an in-cell touch display device according to one embodiment of the present disclosure.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to an in-cell touch display device for compensating a common voltage. The cell touch display device may be embodied a flat panel display device such as liquid crystal display (LCD), field emission display (FED), plasma display panel (PDP), organic light-emitting eiode-based display or organic light emitting display (OLED), electrophoresis display (EPD).

In a following description, it is assumed that the in-cell touch display device in accordance with the present disclosure is implemented as a liquid crystal display device (LCD). However, the present disclosure is not limited thereto. The in-cell touch display device in accordance with the present disclosure may be implemented as any display device to which the in-cell touch technology is applied.

Hereinafter, an in-cell touch display device according to an embodiment of the present disclosure will be described in detail with reference to FIGS. 1 to 12.

FIG. 1 illustrates an in-cell touch display device according to one embodiment of the present disclosure.

Figure 2:
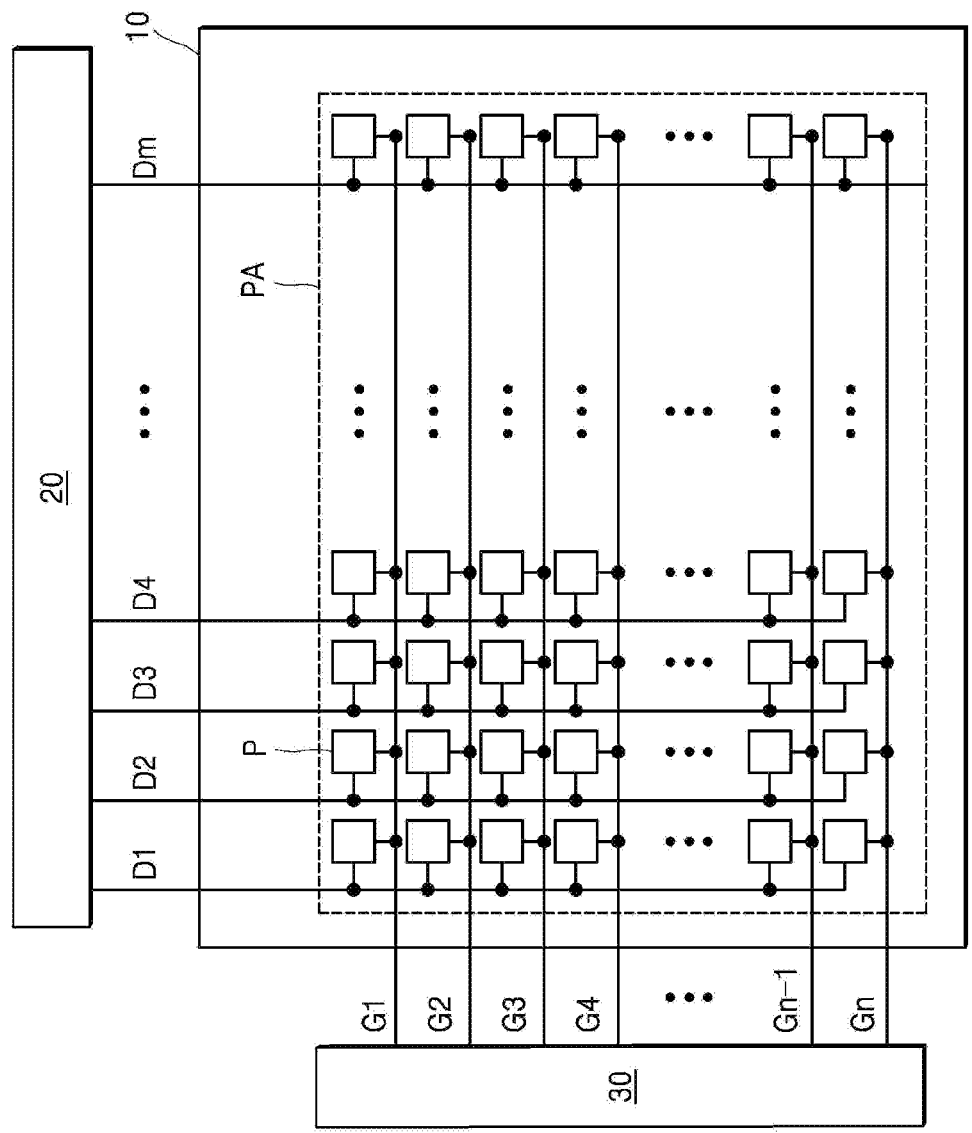
FIG. 2 shows pixel electrodes receiving voltages from a plurality of data lines and gate lines according to one embodiment of the present disclosure.

FIG. 2 shows pixel electrodes receiving voltages from a plurality of data lines and gate lines according to one embodiment of the present disclosure.

Figure 3:
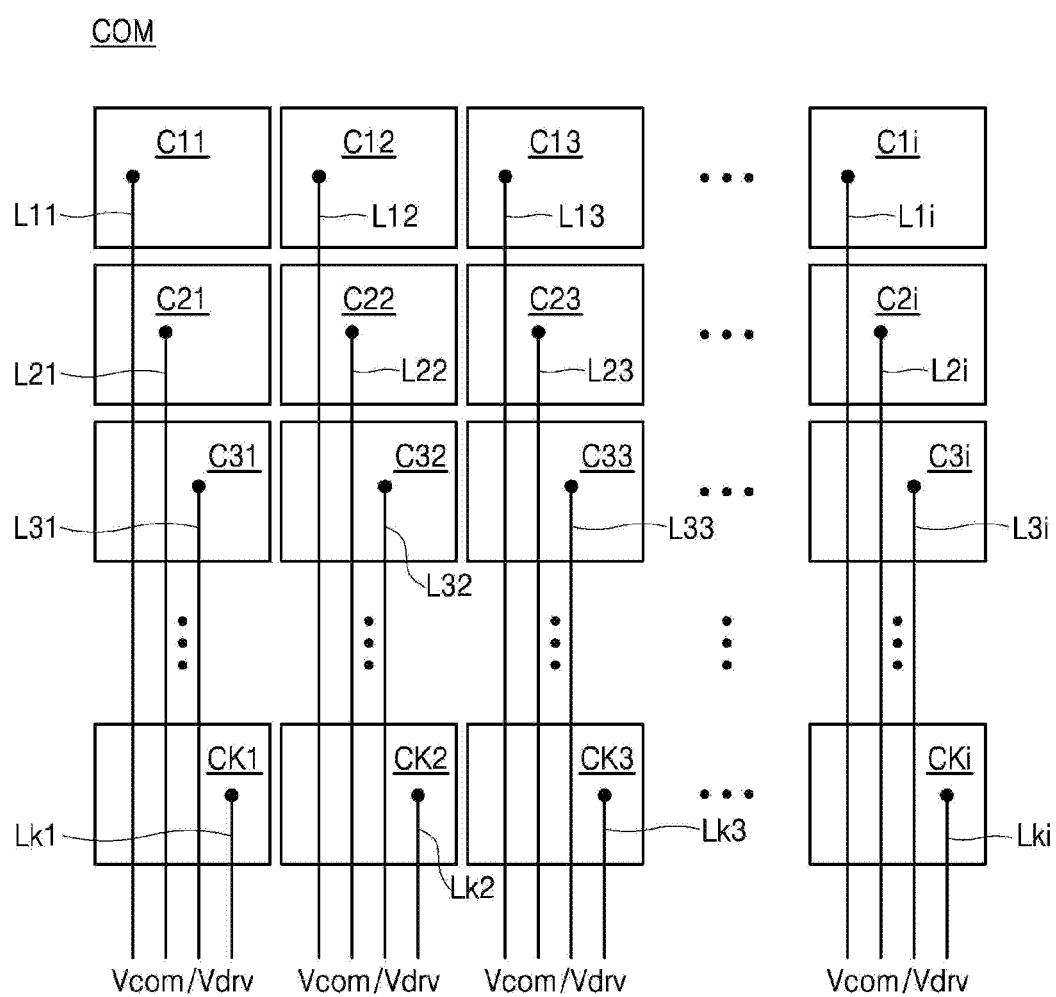
FIG. 3 shows a touch electrode receiving a common voltage or a touch driving voltage through a sensing line according to one embodiment of the present disclosure.

FIG. 3 shows a touch electrode receiving a common voltage or a touch driving voltage through a sensing line according to one embodiment of the present disclosure.

Figure 4:
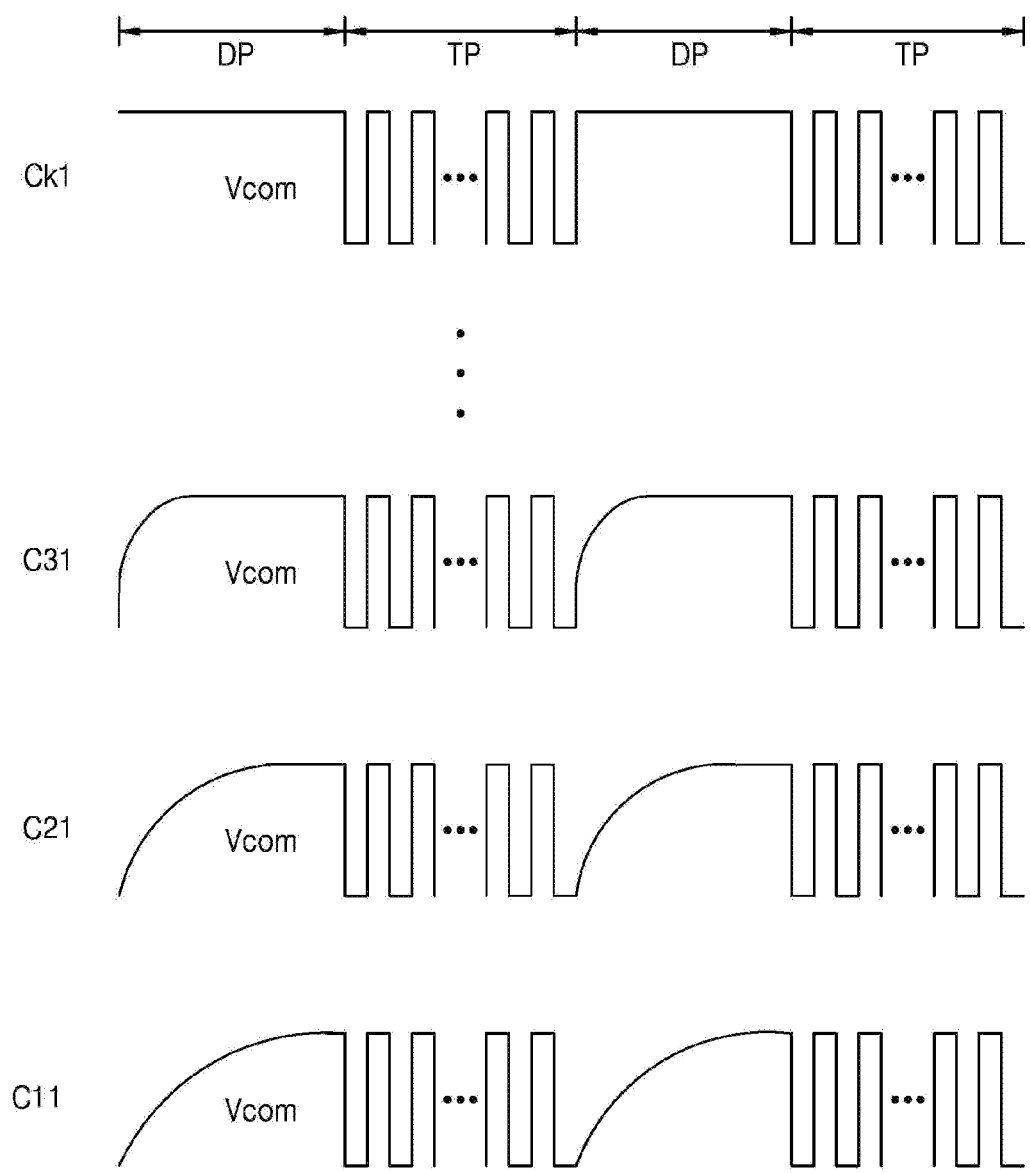
FIG. 4 shows a common voltage that is delayed based on a position of a touch electrode shown in FIG. 3 according to one embodiment of the present disclosure.

FIG. 4 shows a common voltage that is delayed based on a position of a touch electrode shown in FIG. 3 according to one embodiment of the present disclosure.

Figure 5:
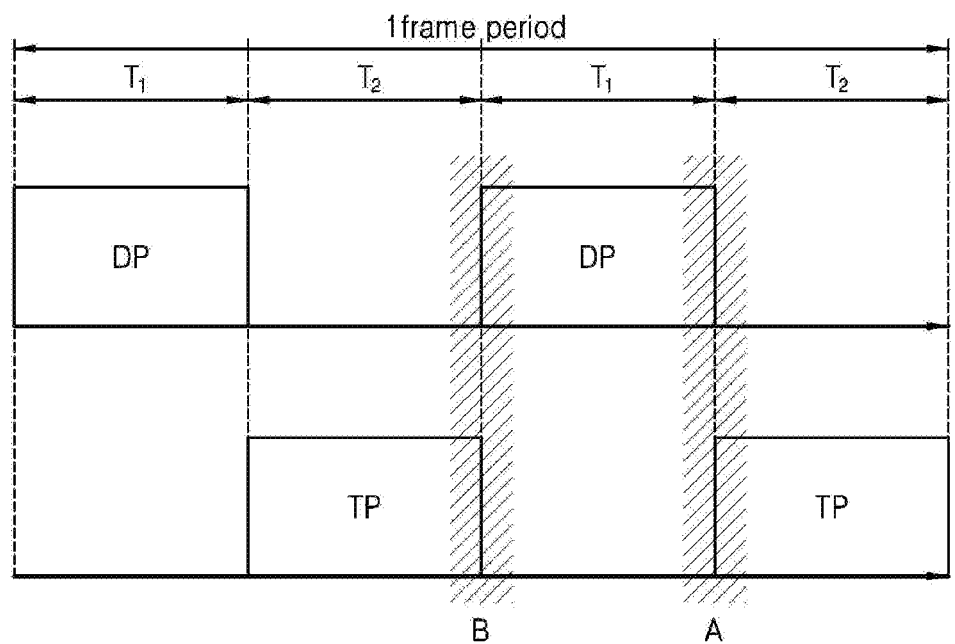
FIG. 5 illustrates a time-divided driving scheme according to one embodiment of the present disclosure.
Figure 6:
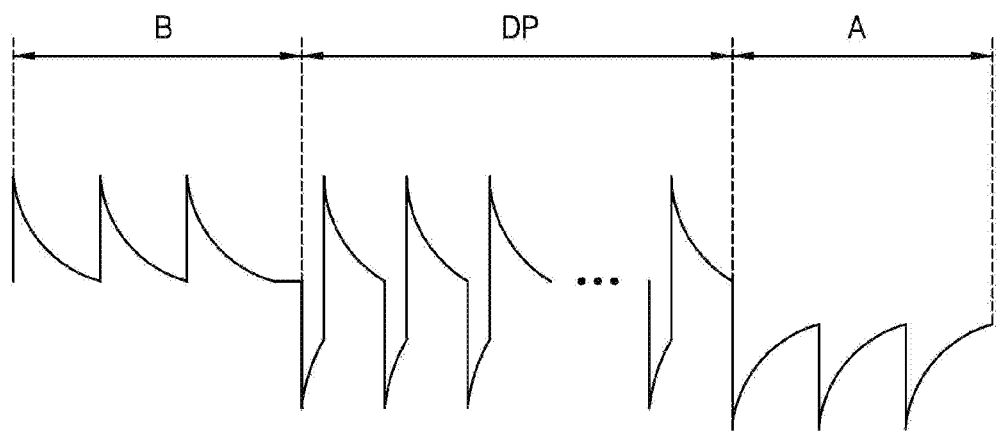
FIG. 6 shows a ripple component of a common voltage generated in accordance with the time-divided driving scheme shown in FIG. 5 according to one embodiment of the present disclosure.

FIG. 5 illustrates a time-divided driving scheme. FIG. 6 shows a ripple component of a common voltage generated in accordance with the time-divided driving scheme shown in FIG. 5 according to one embodiment of the present disclosure.

Figure 7A:
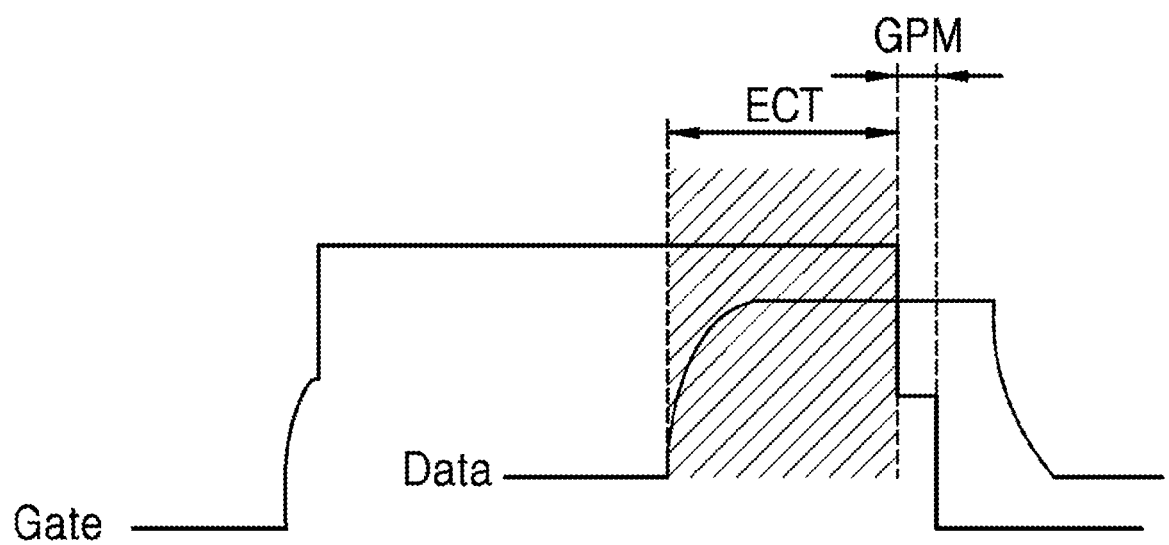
FIG. 7A and FIG. 7B show a GPM (Gate Pulse Modulation) technique for canceling the ripple component shown in FIG. 6 according to one embodiment of the present disclosure.
Figure 7B:
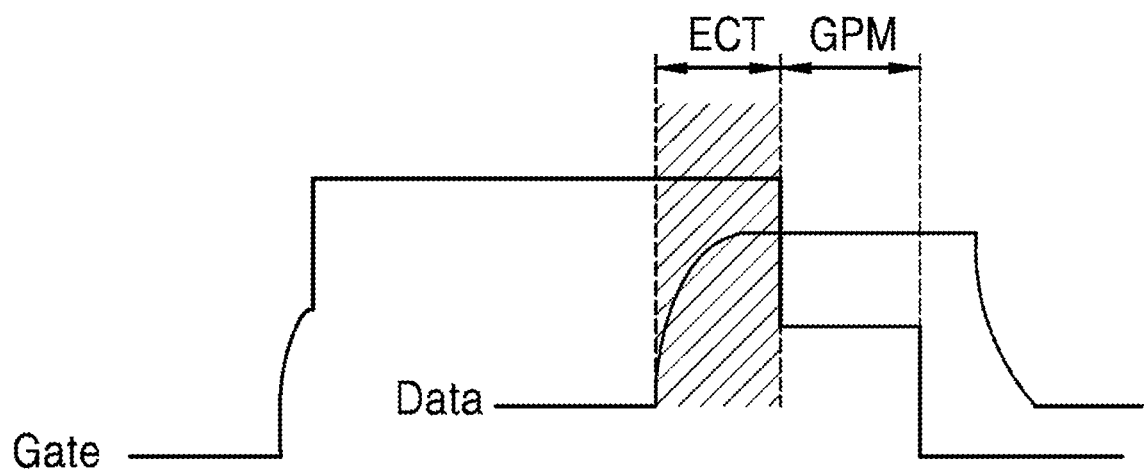

FIG. 7A and FIG. 7B show GPM (Gate Pulse Modulation) technique for canceling the ripple component shown in FIG. 6 according to one embodiment of the present disclosure.

Figure 8:
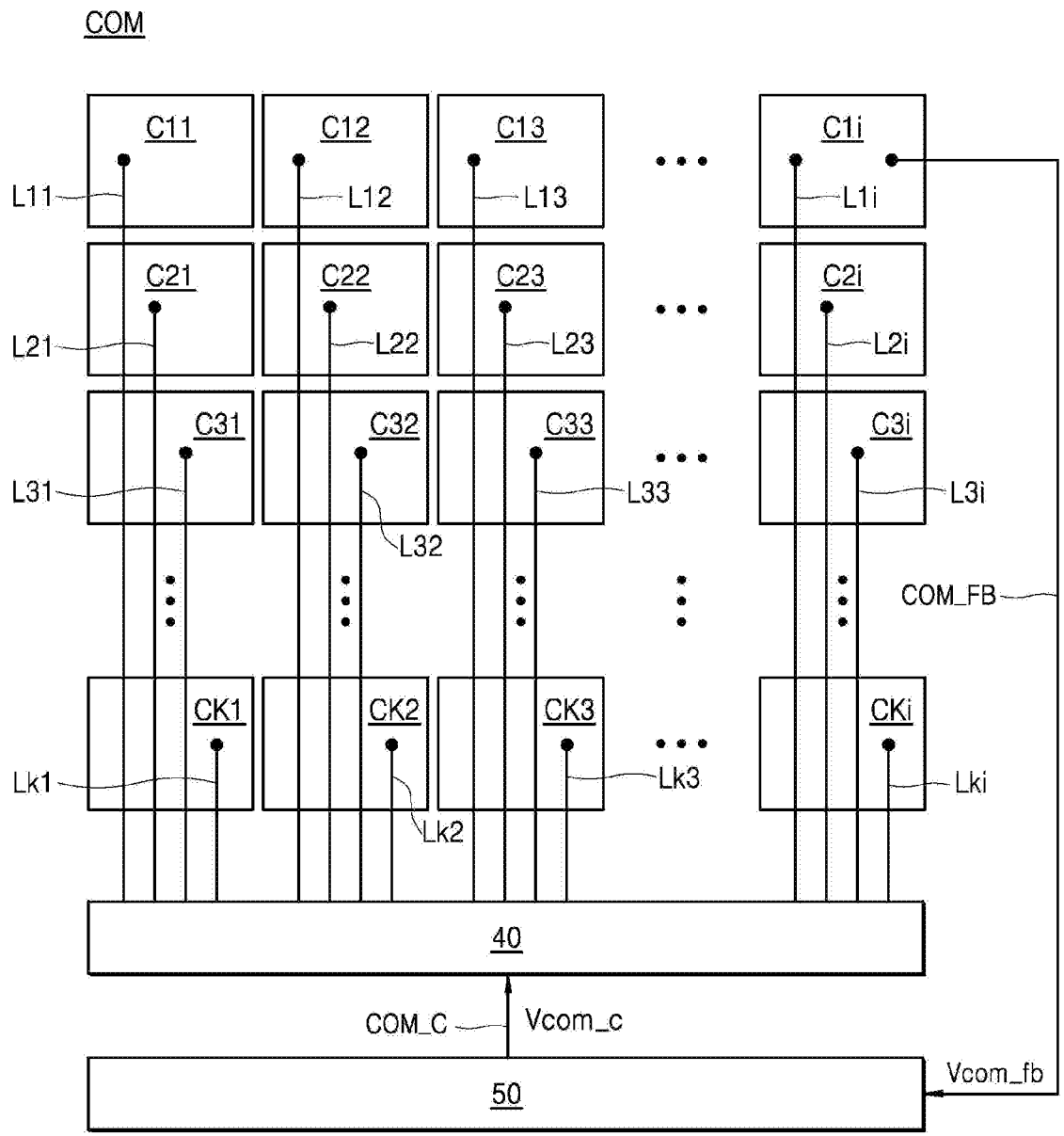
FIG. 8 and FIG. 9 show that a feedback common voltage is sensed through the longest sensing line among a plurality of sensing lines respectively connected to a plurality of touch electrodes according to one embodiment of the present disclosure.
Figure 9:
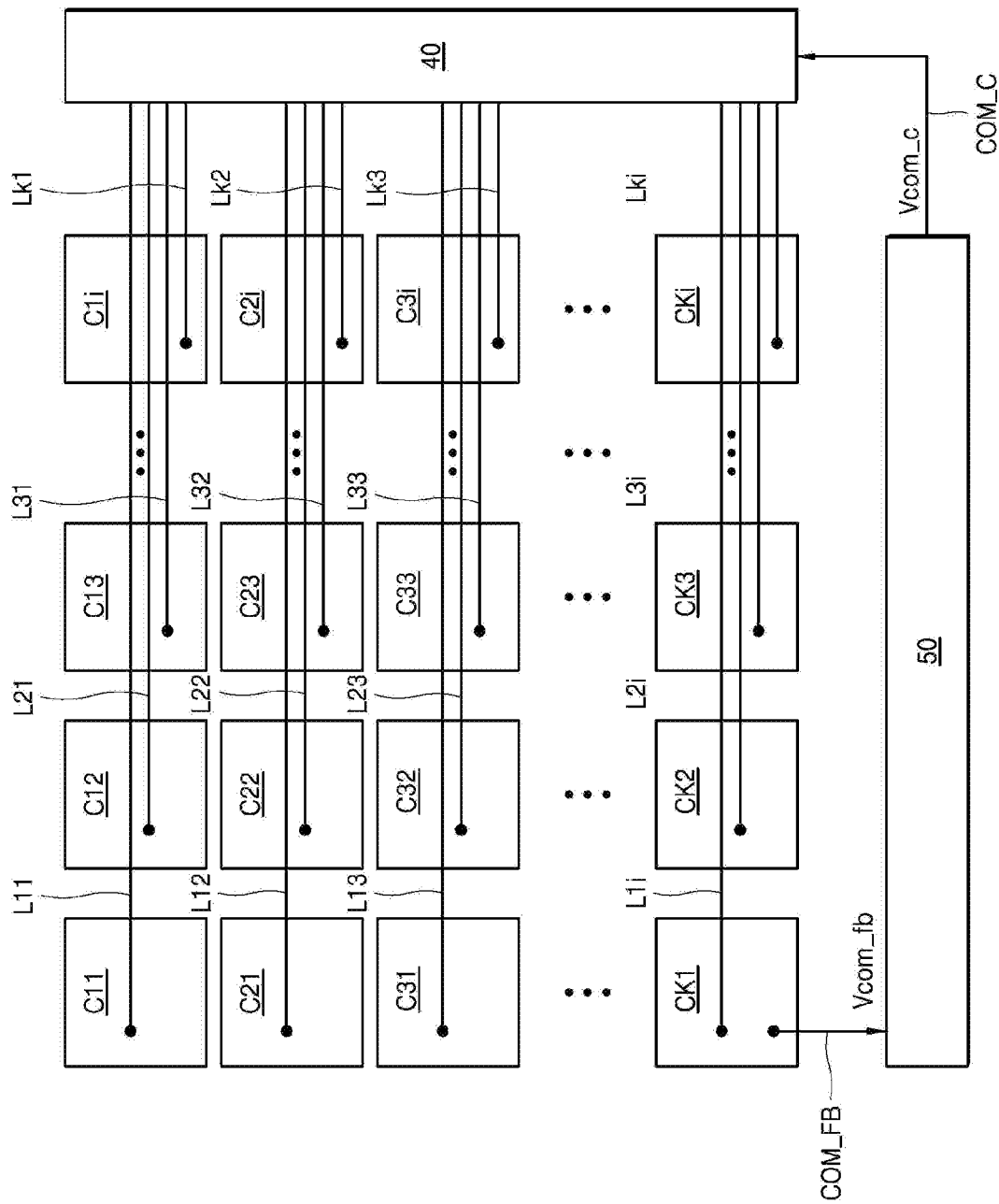

FIG. 8 and FIG. 9 show that a feedback common voltage is sensed through the longest sensing line among a plurality of sensing lines respectively connected to a plurality of touch electrodes according to one embodiment of the present disclosure.

Figure 10:
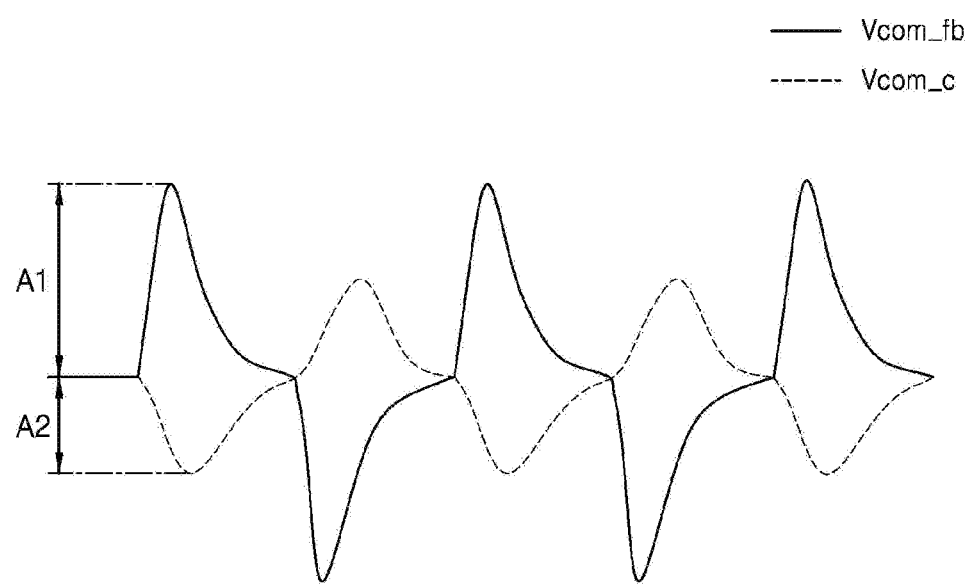
FIG. 10 shows a feedback common voltage and a compensating common voltage for cancelling ½ of a ripple component of the feedback common voltage according to one embodiment of the present disclosure.

FIG. 10 shows a feedback common voltage and a compensating common voltage for cancelling ½ of a ripple component of the feedback common voltage according to one embodiment of the present disclosure.

Figure 11:
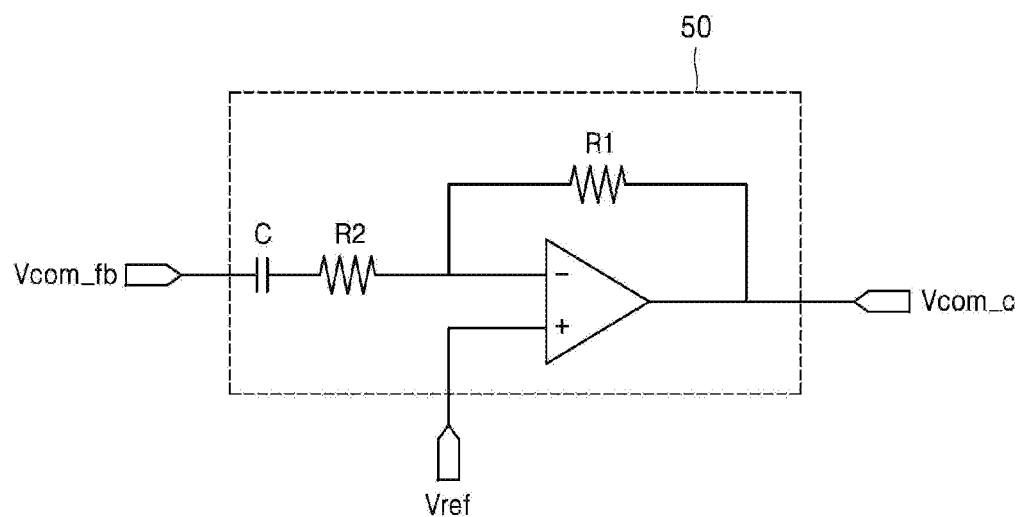
FIG. 11 shows an example of a common voltage compensator shown in FIG. 1 according to one embodiment of the present disclosure.

FIG. 11 shows an example of a common voltage compensator shown in FIG. 1 according to one embodiment of the present disclosure.

Figure 12:
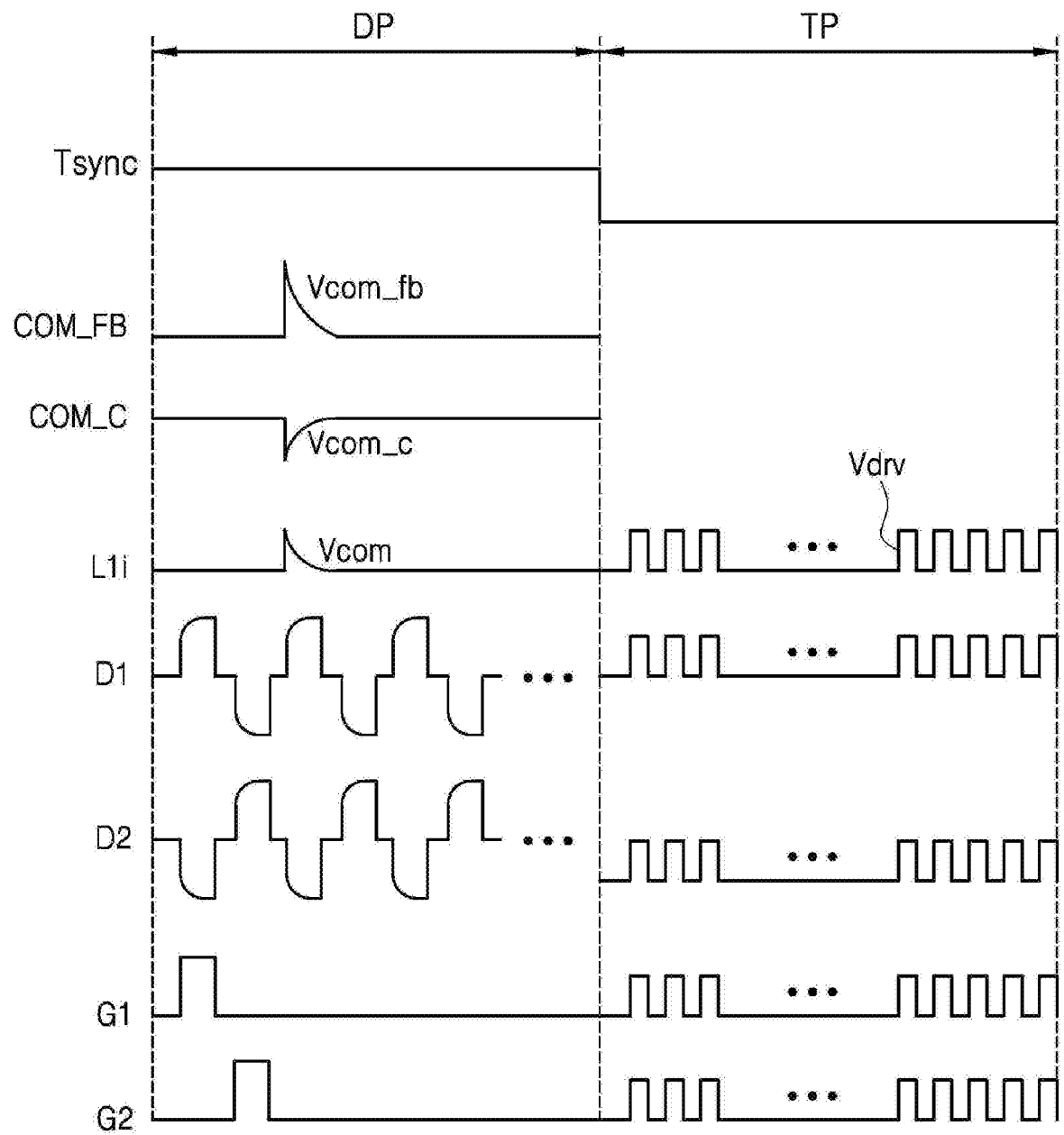
FIG. 12 shows a signal supplied to each signal line according to the time-divided driving scheme according to one embodiment of the present disclosure.

FIG. 12 shows a signal supplied to each signal line according to the time-divided driving scheme according to one embodiment of the present disclosure.

Referring to FIG. 1, an in-cell touch display device 1 according to an embodiment of the present disclosure includes a display panel 10, a data driver 20, a gate driver 30, a touch driver 40, a common voltage compensator 50, a timing controller TC, and a main processor MP. The in-cell touch display device 1 shown in FIG. 1 is merely one embodiment of the present disclosure. Components thereof are not limited to the embodiment shown in FIG. 1. Some components may be added, changed or deleted as needed.

The display panel 10 may include a pixel array PA as a display region in which an image is displayed, and a bezel as a non-display region outside the pixel array PA. Further, the display panel 10 may include a lower substrate, an upper substrate, and a liquid crystal layer provided between the lower substrate and the upper substrate. On the lower substrate of the display panel 10, a plurality of data lines D1 to Dm, a plurality of gate lines G1 to Gn, a plurality of sensing lines L11 to L1$i$, L21 to L2$i$, L31 to L3$i$, . . . , Lk1 to Lk$i$, and a feedback line COM_FB may be formed, wherein each of m, n, k and i is an integer greater than 1.

The display panel 10 includes a plurality of pixel electrodes P for displaying an image in a display period DP and a plurality of touch electrodes C11 to Cki for recognizing touch in a touch period TP. The display panel 10 may be driven such that one frame period is time-divided into a display period DP and a touch period TP. In other words, in the display period DP, each pixel electrode P may output an image according to input data, and in the touch period TP, each of the touch electrodes C11 to Cki may recognize a touch from a user.

A configuration and driving method of the pixel electrodes P and the touch electrodes C11 to Cki will be described in detail with reference to FIGS. 1 to 3.

Referring to FIG. 2, a plurality of pixel electrodes P are provided in the pixel array PA. Each pixel electrode may be disposed in each of regions defined via intersection between the plurality of data lines D1 to Dm and the plurality of gate lines G1 to Gn.

Each pixel electrode P may be connected to each data line or each gate line to receive a data voltage and gate voltage.

More specifically, as shown in FIG. 1, each pixel electrode P may be connected to a transistor TFT formed in each of the regions defined via the intersection of the plurality of data lines D and the plurality of gate lines G. In this connection, the transistor TFT is turned on by a gate voltage applied to each gate line G to allow a data voltage applied to each data line D to be supplied to each pixel electrode P.

The pixel electrode P may generate an electric field corresponding to a potential difference between the data voltage supplied through the transistor TFT and a common voltage Vcom applied from the common electrode COM. The liquid crystal molecules included in the liquid crystal layer may control an amount of light transmitted therethrough based on the corresponding electric field. Accordingly, a specific image may be displayed on the display panel. Meanwhile, a storage pixel capacitor Cst connected to the pixel electrode P may maintain the potential difference applied across the pixel electrode P.

The driving method of the pixel electrode P will be described in more detail. The gate driver 30 may supply a gate voltage to each of the plurality of pixel electrodes P through each of the plurality of gate lines G1 to Gn for the display period DP. Further, for the display period DP, the data driver 20 may supply a data voltage to each of the plurality of pixel electrodes P through each of the plurality of data lines D1 to Dm intersecting the plurality of gate lines G1 to Gn.

For the display period DP, a common voltage Vcom may be supplied to the common electrode COM. In this connection, the common voltage Vcom may be supplied by the touch driver 40 as described later. In other words, the touch driver 40 may supply the common voltage Vcom to the touch electrodes C11 to Cki for the display period DP.

Referring again to FIG. 1, the main processor MP outputs, to the timing controller TC, a plurality of timing signals, for example, a vertical sync signal Vsync, a horizontal sync signal Hsync, a data enable signal DE, a main clock MCLK with digital video data (RGB) of input video.

The timing controller TC may generate a sync signal Tsync to distinguish the display period DP and the touch period TP from each other.

In the display period DP, the timing controller TC may synchronize operation timings of the gate driver 30 and the data driver 20 based on the timing signal as described above.

To this end, the timing controller TC may provide, to the gate driver 30, a gate timing control signal such as a gate start pulse GSP, a gate shift clock GSC, and a gate output enable signal GOE.

In addition, the timing controller TC may provide, to the data driver 20, a data timing control signal such as a source sampling clock SSC, a polarity control signal POL, and a source output enable signal SOE.

Based on the gate/data timing control signals, the gate driver 30 may sequentially supply the gate voltage to the plurality of gate lines G1 to Gn, while the data driver 20 may sequentially supply the data voltage to the plurality of data lines D1 to Dm.

Next, referring to FIG. 3, the touch electrodes C11 to Cki may be capacitance-based electrodes. The common electrode COM for applying the common voltage Vcom to the pixel electrode P may be divided into the touch electrodes C11 to Cki. Accordingly, the touch electrodes C11 to Cki may be embedded in the pixel array PA.

The touch electrodes C11 to Cki are arranged in a matrix form. The touch electrodes C11 to Cki may be connected to the touch driver 40 via a plurality of sensing lines L11 to Lki. The touch driver 40 supplies an electric charge to each of the touch electrodes C11 to Cki connected to each of the sensing lines L11 to Lki. The touch driver 40 may sense capacitance change of each touch electrode C11 to Cki through each of the sensing lines L11 to Lki to recognize the touch.

The driving method of the touch electrodes C11 to Cki as described above will be described in more detail. The touch driver 40 may supply a touch driving voltage Vdry to each of the touch electrodes C11 to Cki through each of the plurality of sensing lines L11 to Lki respectively connected to the plurality of touch electrodes C11 to Cki for the touch period TP.

Each of the touch electrodes C11 to Cki based on the capacitance scheme shown in FIG. 3 increases the capacitance thereof when the user's body is proximal to or touches each of the touch electrodes C11 to Cki. Thus, the touch driver 40 may measure the amount of the capacitance change and detect the touch position and touch area based on the measured amount.

Based on this detection, the touch driver 40 may generate coordinate information XY of the touch position which may be provided to the main processor MP. Then, the main processor MP may execute an application program associated with the coordinate information XY provided from the touch driver 40.

In one example, the present disclosure describes that the common voltage is applied to the liquid crystal display device. However, the present disclosure is not limited thereto. In another example, the common voltage should be interpreted as a voltage that is commonly applied to a pixel electrode in a flat panel display device, for example, a high-potential/low-potential power voltage commonly applied to a pixel electrode of an organic light-emitting diode-based display device (OLED).

Hereinafter, referring to FIG. 3, FIG. 7A and FIG. 7B, a ripple component of a common voltage Vcom generated based on the time-divided driving scheme, and a method for canceling the ripple component of the common voltage Vcom using GPM (Gate Pulse Modulation) will be described in detail.

Referring to FIG. 4, for the display period DP, the common voltage Vcom may be supplied to each touch electrode C11 to Cki. For the touch period TP, a touch driving voltage Vdrv may be applied to each touch electrode C11 to Cki.

In one example, as shown in FIG. 3, lengths of the sensing lines L11 to Lkl for supplying the common voltage Vcom in one row may be different depending on the positions of the touch electrodes C11 to Ck1. Due to the difference (RC delay) of the lengths of the sensing lines L11 to Lk1, a delay time difference may occur between the common voltages Vcom applied to the touch electrodes C11 to Ck1.

For example, as shown in FIG. 4, as the length of a corresponding sensing line increases, the delay time of the common voltage Vcom applied to a corresponding touch electrode C11 may increase.

In a large area display device, the difference between the lengths of the sensing lines becomes larger. Accordingly, non-uniformity between the common voltages Vcom may further increase.

When a gate voltage and a data voltage are applied to the pixel electrode P in the state where the common voltages Vcom are non-uniform, a ripple component may occur in the common voltage Vcom applied to each touch panel (each of subdivided common electrodes COM). Thus, such a ripple component may cause horizontal crosstalk.

In FIG. 4, an amplitude of the touch driving voltage Vdry is shown to be the same as an amplitude of the common voltage Vcom for convenience of explanation. However, the amplitude of the touch driving voltage Vdry may be set differently from the amplitude of the common voltage Vcom.

In one example, the display panel 10 in accordance with the present disclosure may sense a stylus pen touch as well as a finger touch. To this end, the display panel 10 may be driven such that one frame period is time-divided into a plurality of display periods DP and a plurality of touch periods TP having the same driving time duration.

In this connection, one frame period may mean a period in which one frame of input data is displayed into an image on the display panel 10.

In one example, referring to FIG. 5, two display periods DPs and two touch period TPs may be contained within one frame period, wherein the two display periods DPs and two touch period TPs have the same driving durations T1 and T2. Thus, one frame of input data may be displayed over the two display periods DPs.

More specifically, after an image corresponding to ½ of one frame is displayed in the first display period DP, a touch is recognized in a first touch period TP. In a second display period DP, an image corresponding to remaining ½ of one frame is displayed.

For this purpose, each time an image corresponding to ½ of one frame is displayed, a gate voltage cutoff and an application of the touch driving voltage Vdry may be repeated.

When the gate voltage cutoff and the application of the touch driving voltage Vdry are repeated within one frame, an asymmetric ripple component occurs in the common voltage Vcom as shown in FIG. 6. Such a ripple component may cause horizontal crosstalk and dim.

In order for the main processor (MP) to suppress the above-mentioned ripple component, when the gate voltage changes from a high level to a low level, the MP may use the GPM scheme to lower the gate voltage sequentially by a certain voltage level across a range between the high and low levels.

However, when the GPM scheme is applied to a large area display device as shown in FIG. 7B, an effective charging time (ECT) of the pixel electrode P may not be secured sufficiently whereas when the GPM scheme is applied to the small area display device as shown in FIG. 7A, an effective charging time (ECT) of the pixel electrode P may be secured sufficiently.

Accordingly, a method of canceling the ripple components included in the common voltage Vcom when the GPM scheme is applied to the large area display device is required.

Hereinafter, a method of removing the ripple component included in the common voltage Vcom will be described in detail with reference to FIG. 1, and FIGS. 8 to 11.

The common voltage compensator 50 may sense a feedback common voltage Vcom_fb from one touch electrode of the plurality of touch electrodes C11 to Cki.

More specifically, the common voltage compensator 50 may be connected to one touch electrode of the plurality of touch electrodes C11 to Cki through a feedback line COM_FB. When the common voltage Vcom is supplied to each touch electrode C11 to Cki by the touch driver 40, the common voltage compensator 50 may sense the feedback common voltage Vcom_fb from one touch electrode via the feedback line COM_FB.

As described with reference to FIG. 3 and FIG. 4, the ripple component associated with a touch electrode connected to the longest sensing line may be the largest.

To perform the compensation based on the touch electrode corresponding to the largest ripple component, the common voltage compensator 50 may sense the feedback common voltage Vcom_fb from the touch electrode connected to the longest sensing line among the plurality of sensing lines L11 to Lki.

In one example, referring to FIG. 8, the touch driver 40 may supply the common voltage Vcom in a column direction of the display panel 10 (in a y-axis direction in FIG. 1). In this connection, the plurality of touch electrodes C11 to Cli arranged on a first row of the display panel 10 may be respectively connected to the longest sensing lines L11 to L1i among the plurality of sensing lines L11 to Lki.

Accordingly, the common voltage compensator 50 may sense the feedback common voltage Vcom_fb from one touch electrode disposed on the first row of the display panel 10. To this end, the feedback line COM_FB may be connected to any one touch electrode of the plurality of touch electrodes C11 to C1i arranged in the first row of the display panel 10.

In another example, referring to FIG. 9, the touch driver 40 may supply the common voltage Vcom in a row direction of the display panel 10, that is, in a x-axis direction of FIG. 1. In this connection, the plurality of touch electrodes C11 to Ck1 arranged in a first column of the display panel 10 may be respectively connected to the longest sensing lines L11 to L1i among the plurality of sensing lines L11 to Lki.

Accordingly, the common voltage compensator 50 may sense the feedback common voltage Vcom_fb from one touch electrode disposed in the first column of the display panel 10. To this end, the feedback line COM_FB may be connected to any one touch electrode of the plurality of touch electrodes C11 to Ck1 arranged in the first column of the display panel 10.

When the feedback common voltage Vcom_fb is sensed, the common voltage compensator 50 may supply a compensating common voltage Vcom_c to cancel ½ of the ripple component of the feedback common voltage Vcom_fb to the plurality of touch electrodes C11 to Cki.

A compensating line COM_C from which the compensating common voltage Vcom_c is output may be connected to each sensing line L11 to Lki. In this case, since the common voltage compensator 50 is connected to the plurality of touch electrodes C11 to Cki through the compensating line COM_C, the compensating common voltage Vcom_c may be directly supplied to each touch electrode C11 to Cki. Alternatively, the compensating line COM_C of the common voltage compensator 50 may be coupled to the touch driver 40. In this case, when supplying the compensating common voltage Vcom_c to the touch driver 40, the touch driver 40 may supply the compensating common voltage Vcom_c to each touch electrode C11 to Cki.

Referring to FIG. 10, the common voltage compensator 50 may generate the compensating common voltage Vcom_c whose magnitude has ½ of the ripple component included in the feedback common voltage Vcom_fb and which is opposite in polarity to the ripple component. In other words, a length of A1 shown in FIG. 10 may be twice a length of A2.

The common voltage compensator 50 may include any circuit known in the art to compensate for the ripple component of the common voltage Vcom. Such a circuit may generate the compensating common voltage Vcom_c for compensation for the ripple component.

In one example, as shown in FIG. 11, the common voltage compensator 50 includes an inverting amplifier. The inverting amplifier may include an inverted input terminal connected to the feedback line COM_FB fed with the feedback common voltage Vcom_fb, a non-inverted input terminal connected to a reference voltage source, and an output terminal from which the compensating common voltage Vcom_c is output.

Further, the common voltage compensator 50 may further include a first resistor R1 connected to and between the inverted input terminal and the output terminal, and a capacitor C receiving the feedback common voltage Vcom_fb from the feedback line COM_FB, and a second resistor R2 connected to and between the capacitor C and the inverted input terminal.

More specifically, one end of the capacitor C is connected to the feedback line COM_FB connected to one of the touch electrodes. Accordingly, the feedback common voltage Vcom_fb is supplied to one end of the capacitor C. The capacitor C may store a change amount of the feedback common voltage Vcom_fb, that is, a ripple component of the feedback common voltage Vcom_fb.

The non-inverted input terminal of the inverting amplifier may be connected to the reference voltage Vref source to receive the reference voltage Vref therefrom. The reference voltage Vref may be a DC voltage of a predetermined magnitude according to a design need.

Accordingly, the inverting amplifier inverts and compensates the ripple component of the common voltage Vcom input to the inverted input terminal using the reference voltage Vref input to the non-inverted input terminal and based on a ratio of resistance values of the first and second resistors R1 and R2. Then, the compensated and inverted ripple component may be output to the output terminal.

The resistor value of the first resistor R1 connected to the inverting amplifier may be set to ½ of the resistor value of the second resistor R2 connected thereto to produce the compensating common voltage Vcom_c to cancel ½ of the ripple component. In this connection, the signal output to the output terminal may be the compensating common voltage Vcom_c.

The output terminal of the inverting amplifier is connected to the compensating line COM_C. The compensating line COM_C is connected to each of the plurality of sensing lines L11 to Lki. Thus, the compensating common voltage Vcom_c may be supplied directly to each touch electrode C11 to Cki. In an alternative, the compensating line COM_C is connected to the touch driver 40, and the compensating common voltage Vcom_c is provided to the touch driver 40. Thus, the touch driver 40 may supply the compensating common voltage Vcom_c to each touch electrode C11 to Cki.

As described above, according to the present disclosure, when compensating for ½ of the ripple component of the common voltage sensed from one touch electrode of the plurality of touch electrodes, the device may compensate for the common voltage applied to each of all touch electrodes via the single feedback line. Therefore, the GPM (Gate Pulse Modulation) is applied in driving of the large area pixel electrode, the effective charging time (ECT) can be secured for all pixels.

Further, according to the present disclosure, compensating the ripple component of the common voltage sensed from the touch electrode connected to the longest sensing line supplying the common voltage may result in improving the consistency and efficiency of the common voltage compensating operation via the single feedback line.

In other words, the feedback common voltage is sensed from the touch electrode corresponding to the largest ripple component, and, then, the ripple component is compensated for based on this sensed feedback common voltage. Thus, the common voltage compensating operation for all the touch electrodes arranged on the display panel can be performed in a consistent manner.

Referring to FIG. 12, the operation of the in-cell touch display device 1 in accordance with the present disclosure is summarized as follows. According to a sync signal Tsync provided from the timing controller TC, the display panel 10 displays an image in a display period DP and recognizes a touch in a touch period TP.

In the display period DP, the data voltage of the input image is sequentially supplied to the plurality of data lines D1 to Dm. A gate voltage synchronized to the corresponding data voltage may be sequentially supplied to the plurality of gate lines G1 to Gn.

In the display period DP, the feedback common voltage Vcom_fb from each of the C1i and Ck1 touch electrodes shown in FIG. 8 and FIG. 9 may be provided via the feedback line COM_FB. Thus, the compensating common voltage Vcom_c for compensating for the ripple component of the feedback common voltage Vcom_fb may be provided through the compensating line COM_C.

Accordingly, the common voltage Vcom supplied through the sensing line L1i in the display period DP may be provided to the touch electrodes C1i and Ck1 while the common voltage Vcom has a ripple component reduced by ½ of the ripple component included in the feedback common voltage Vcom_fb.

In the touch period TP, the transistor TFT that applies the data voltage to the pixel electrode P is turned off, so that the pixel electrode P may maintain the data voltage charged in the display period DP.

In this connection, at least one of the plurality of gate lines G1 to Gn and at lease one of the plurality of data lines D1 to Dm may be supplied with a voltage having the same phase and amplitude as the touch driving voltage Vdrv.

More specifically, in order to minimize the parasitic capacitance between the plurality of touch electrodes C11 to Cki and the gate lines G1 to Gn in the touch period TP, the gate driver 30 may supply a voltage having the same phase and amplitude as the touch driving signal applied to the touch electrode C11 to Cki to the gate lines G1 to Gn.

Similarly, in order to minimize the parasitic capacitance between the plurality of touch electrodes C11 to Cki and the data lines D1 to Dm in the touch period TP, the data driver 20 may supply a voltage having the same phase and amplitude as the touch driving signal applied to the touch electrode C11 to Cki to the data lines D1 to Dm.

As described above, in accordance with the present disclosure, the touch recognition sensitivity may be improved by minimizing the parasitic capacitance between the touch electrode and the gate line and data line within the touch period according to the time-divided driving scheme.

The present disclosure as described above is not limited to the above-described embodiments and the accompanying drawings. It will be obvious to those skilled in the art that various substitutions, modifications and variations are possible without departing from the technical disclosure of the present disclosure. Therefore, the scope of the present disclosure is to be defined by the appended claims. It is intended that all changes and modifications that come within the meaning and range of equivalency of the claims and the equivalents thereof be included within the scope of the present disclosure.

What is claimed is:

1. An in-cell touch display device comprising:
   a display panel having a plurality of pixel electrodes for displaying an image in a display period and a plurality of touch electrodes for recognizing a touch in a touch period;
   a data driver for supplying a data voltage to the plurality of pixel electrodes via a plurality of data lines;
   a gate driver for supplying a gate voltage to the plurality of pixel electrodes via a plurality of gate lines intersecting the plurality of data lines;
   a touch driver for supplying a common voltage to the plurality of touch electrodes through a plurality of sensing lines respectively connected to the plurality of touch electrodes; and
   a common voltage compensator configured for:
      sensing a feedback common voltage from one touch electrode among the plurality of touch electrodes; and
      supplying a compensating common voltage for cancelling half of a ripple component of the feedback common voltage to the plurality of touch electrodes.

2. The in-cell touch display device of claim 1, wherein the common voltage compensator senses the feedback common voltage from a touch electrode connected to a longest sensing line among the plurality of sensing lines.

3. The in-cell touch display device of claim 1, wherein the touch driver supplies the common voltage in a column direction of the display panel,
wherein the common voltage compensator senses the feedback common voltage from one touch electrode in a first row of the display panel.

4. The in-cell touch display device of claim 1, wherein the touch driver supplies the common voltage in a row direction of the display panel,
wherein the common voltage compensator senses the feedback common voltage from one touch electrode in a first column of the display panel.

5. The in-cell touch display device of claim 1, wherein the common voltage compensator is further configured for:
generating the compensating common voltage having a half magnitude of the ripple component and an opposite polarity to a polarity of the ripple component; and
supplying the generated compensating common voltage to the plurality of touch electrodes.

6. The in-cell touch display device of claim 1, wherein the common voltage compensator includes:
an inverting amplifier including:
an inverted input terminal connected to a feedback line to which the feedback common voltage is supplied;
a non-inverted input terminal connected to a reference voltage source; and
an output terminal for outputting the compensating common voltage;
a first resistor disposed between and connected to the inverted input terminal and the output terminal;
a capacitor for receiving the feedback common voltage from the feedback line; and
a second resistor disposed between and connected to the capacitor and the inverted input terminal.

7. The in-cell touch display device of claim 6, wherein a resistance value of the first resistor is half of a resistance value of the second resistor.

8. The in-cell touch display device of claim 1, wherein the display panel is driven such that one frame period is temporally divided into a display period and a touch period,
wherein in the display period, the gate voltage is sequentially supplied to the plurality of gate lines, the data voltage is supplied sequentially to the plurality of data lines, and the common voltage is supplied to the plurality of touch electrodes,
wherein in the touch period, a touch driving voltage is supplied to the plurality of the touch electrodes, and a voltage having a same phase and amplitude as the touch driving voltage is supplied to at least one of the plurality of gate lines and at least one of the plurality of data lines.

9. The in-cell touch display device of claim 1, wherein the display panel is driven such that one frame period is temporally divided into a plurality of display periods and a plurality of touch periods having a same driving time duration.

* * * * *